UNITED STATES PATENT OFFICE.

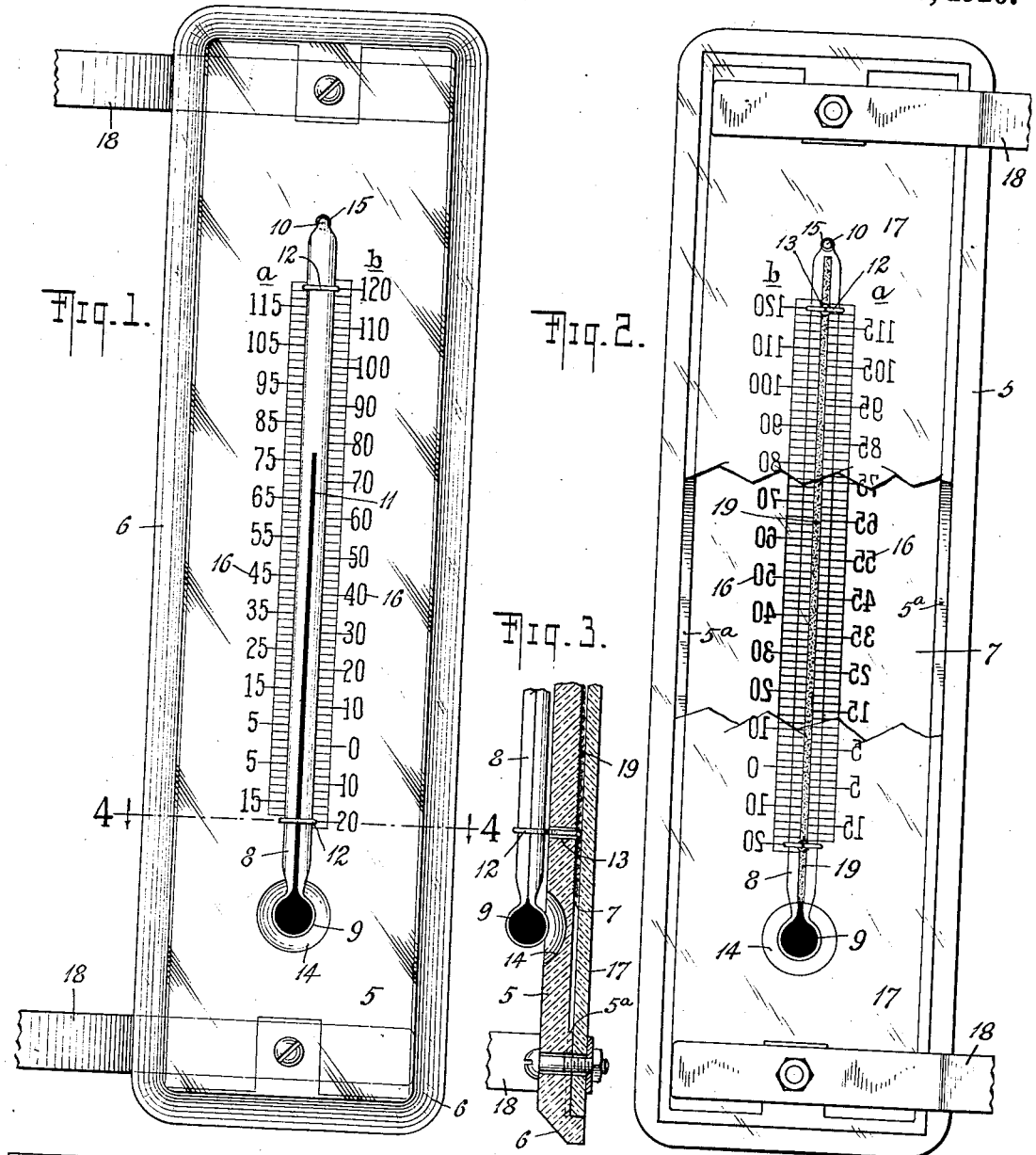

HERBERT P. MILKER, OF BROOKLYN, AND CHRISTIAN E. A. GRONBECH, OF NEW YORK, N. Y., ASSIGNORS TO CHARLES J. TAGLIABUE MANUFACTURING CO., OF BROOKLYN, NEW YORK, A CORPORATION OF NEW YORK.

THERMOMETER.

1,363,803.  Specification of Letters Patent.  Patented Dec. 28, 1920.

Application filed March 20, 1919. Serial No. 283,761.

*To all whom it may concern:*

Be it known that we, HERBERT P. MILKER, a citizen of the United States, and resident of the borough of Brooklyn, county of Kings, city and State of New York, and CHRISTIAN E. A. GRONBECH, a citizen of the United States, and resident of Woodhaven, Long Island, borough and county of Queens, city and State of New York, have invented certain new and useful Improvements in Thermometers, of which the following is a specification.

Our invention relates to thermometers and, more particularly to outside thermometers whereby the outside temperature may be ascertained by viewing said thermometers through a window or the like.

The most satisfactory of such thermometers are those in which the scale plates are constructed entirely of glass; these glass thermometers, as they are commonly termed, because of their transparent or translucent properties, possess a high degree of visibility and are easily read from within a room or the like under all conditions. Up to the present time, thermometers of this type have been provided with scale plates constructed of plate glass which, because of the beveling and other finishing which is required, such as the production of the scale thereon, are expensive to produce. The cost of such plates is further increased because of the care and skill which are required to drill and recess the same for the accommodation of the thermometer tube and bulb. As a result, the selling price is relatively high and thus restricts the field of usefulness to such interests as are able to afford the cost thereof.

The particular purpose of our invention is to provide a glass, outside thermometer which retains all of the advantages recited above and in which all of the disadvantages referred to are overcome. Furthermore, our invention contemplates an arrangement in which the scale is permanent and protected against the effects of the atmosphere and against obliteration.

Other objects of our invention will appear from the description hereinafter and the features of novelty will be pointed out in the appended claims.

In the accompanying drawings, which, for illustrative and descriptive purposes show an example of our invention, Figure 1 is a front elevation of the thermometer; Fig. 2 is a rear elevation thereof; Fig. 3 is a detail longitudinal section; and Fig. 4 is a cross-section on the line 4—4 of Fig. 1.

As shown in the drawings, the thermometer comprises a transparent or translucent scale plate 5 having its edges beveled as indicated at 6, and being dished or recessed at the rear as shown at 7; a shoulder $5^a$ is formed at the back of said plate 5, as shown in Figs. 2, 3, and 4, the purpose of which will appear more fully hereinafter.

The thermometer further includes the customary tube 8 having a bulb 9 at one end and a transversely extending taper 10 at the other end. The tube 8 containing the mercury or other column 11 is secured upon the plate 5 in any well-known way as by means of wires 12 passing through suitable holes 13 in said plate 5; the customary recesses 14 and 15 for the accommodation of the bulb 9 and taper 10 respectively are also provided on said plate 5 at the proper points.

The scale plate 5 is constructed of ordinary glass and is pressed or molded into the desired shape and in its finished condition, when viewed from the front, closely simulates the appearance of the plate glass heretofore considered necessary. The holes 13 and recesses 14 and 15, as well as the shoulder $5^a$ at the rear are formed during the pressing or molding of the plate 5, so that no further manipulation of the plate is required after it has been pressed or molded and the danger of breakage from drilling or recessing, heretofore present in the manufacture of plate glass thermometers, is entirely avoided.

The scale 16 is preferably constructed in the form of a decalcomania and is transferred to the back of the plate 5 within the recess 7, said scale thus being translucent and permitting the passage therethrough of the light rays necessary to make said scale easily visible. It will be understood that said scale may be produced upon the plate in any other well known or desired manner.

In order to insure the greatest ease and accuracy in reading thermometers it is desirable to have the graduations of the scale represent a minimum unit; for instance, in some cases it may be desirable to have the scale divided into graduation marks representing single degree readings while in other instances even smaller sub-divisions may be desirable. Because of lack of space and for other reasons it has heretofore been found necessary to graduate the scale in units greater than the desired minimum unit and to rely upon guesswork for the readings intermediate of the particular graduation marks.

To overcome the above objections, and in order to provide the desirable minimum graduation, whatever it may be, in a given space, the graduations of the scale in the present case are divided into two columns $a$ and $b$ located on opposite sides of the tube 8 and with the graduation marks of one column staggered with respect to the graduation marks of the other column. That is to say, the graduation marks of the column $a$, each of which, in the illustrated example, are spaced apart a distance representing two degrees, are located midway between the graduation marks of the column $b$ which in said example also represent two degrees, and vice versa. Thus, by reading alternately with respect to one column or the other, accurate single degree readings may be obtained. It will be understood that the same arrangement may be utilized in connection with scales in which smaller or larger minimum units are desired.

A glass cover or back 17 is fitted within the plate 5 at the rear and rests against the shoulder $3^a$ as clearly shown in Fig. 3, said back or cover 17 being secured in position in any suitable manner as by being cemented in place by Canada balsam or any other suitable and preferably transparent cement. The back or cover 17 incloses the scale 16 in a sealed chamber and thus protects it against the effects of the atmosphere and the elements thereby making it possible to use a decalcomania or other scale capable of being easily and cheaply applied; obliteration of the scale, either wholly or partly, is thus efficiently and positively prevented. Suitable brackets or equivalent devices 18 may be provided for supporting the thermometer in operative position generally in proximity to a window or the like so as to be capable of being read from within a room or the like, without difficulty.

The transparent or translucent properties of the plate 5 and its connected and coöperating parts make it an easy matter to accurately read the thermometer, even when looking from the relatively subdued light of a room into the more intense outside light which in such case tends to temporarily blind a person. The thermometer herein described and shown thus possesses the high visibility and all of the other very desirable advantages of the plate glass thermometer. At the same time, by reason of its construction, the present thermometer is cheap and economical to produce and thus brings within the reach of all, a type of thermometer which heretofore, because of its cost, has been available to relatively few people. In addition, the present thermometer includes the improved scale which is protected against injury and obliteration and the improved scale arrangement which provides the desirable minimum unit reading.

In order to make the thermometer readily readable in the dark, a strip 19 of radium compound or other luminous substance is placed in the recess 7 either upon the plate 5 as shown or upon the cover 17 and in either case so as to extend lengthwise of and in registry with and behind the mercury or other column 11. In the preferred arrangement the luminous compound is also applied upon the rear of the scale designations and figures. These elements, because of the luminosity of the compound are thus also visible in the dark. As the column 11 rises or falls, the luminous strip 19 is covered thereby or exposed to a greater or less extent so that the temperature may be readily ascertained by consulting the lower end of the visible portion of the strip 19 which always coincides with the upper end of the mercury or other column 11 and reading it in conjunction with the luminous scale.

Various changes in the specific form shown and described may be made within the scope of the claims without departing from the spirit of our invention.

We claim:

1. A thermometer comprising a scale member of glass provided with a recess in its rear face having a scale produced upon its rear face within the recess of said member, a tube secured upon a face of said member and light pervious means for closing said recess and covering said scale.

2. A thermometer comprising a scale plate pervious to light rays and provided with a recess and having a scale applied to its rear face within said recess, a shoulder in said recess, a thermometer tube secured upon a face of said plate, and a light pervious back fitted within said recess and resting against said shoulder, said back being cemented in said recess and inclosing said scale in a sealed chamber.

3. A thermometer comprising a light pervious scale member, a scale thereon, a tube located in operative relation to said scale member and including an indicating column, and a strip having an inherent luminosity and located behind and in registry with said column, said strip being arranged to be progressively covered and uncovered thereby, whereby the indicating end of said indicating column may be located in the dark.

In testimony whereof we have hereunto set our hands.

HERBERT P. MILKER.
CHRISTIAN E. A. GRONBECH.